United States Patent [19]

Jacobson

[11] 4,222,789

[45] Sep. 16, 1980

[54] LIGHT-STABLE TITANIUM DIOXIDE PIGMENT COMPOSITION

[75] Inventor: Howard W. Jacobson, Wilmington, Del.

[73] Assignee: E. I. du Pont de Nemours and Company, Wilmington, Del.

[21] Appl. No.: 965,073

[22] Filed: Nov. 30, 1978

[51] Int. Cl.$^2$ .................... C04B 31/02; C08K 3/22; C09E 1/36

[52] U.S. Cl. .................................................. 106/300

[58] Field of Search ....................................... 106/300

[56] References Cited

U.S. PATENT DOCUMENTS

| | | | |
|---|---|---|---|
| 2,300,470 | 11/1942 | Sitzler | 106/300 |
| 3,383,231 | 5/1968 | Allan | 106/300 |
| 3,432,324 | 3/1969 | Rohrborn et al. | 106/300 |
| 3,832,205 | 8/1974 | Lowery | 106/288 |

FOREIGN PATENT DOCUMENTS

| | | | |
|---|---|---|---|
| 119890 | 10/1943 | Australia | 106/300 |
| 2545243 | 4/1977 | Fed. Rep. of Germany . | |
| 1368601 | 10/1974 | United Kingdom | 106/300 |
| 1531867 | 11/1978 | United Kingdom . | |

*Primary Examiner*—O. R. Vertiz
*Assistant Examiner*—Gregory A. Heller

[57] ABSTRACT

Light-stable TiO$_2$ pigment composition consisting of TiO$_2$, Al$_2$O$_3$ and antimony oxide wherein the Al$_2$O$_3$ and antimony oxide are in solid solution with the TiO$_2$ or in the form of AlSbO$_4$ or a combination of the two.

12 Claims, No Drawings

LIGHT-STABLE TITANIUM DIOXIDE PIGMENT COMPOSITION

DESCRIPTION

1. Technical Field

This invention relates generally to titanium dioxide pigment and, more particularly, to a titanium dioxide pigment containing an oxide or oxides of antimony and aluminum exhibiting improved light stability.

2. Background Art

Titanium dioxide pigment is widely used in industry as an opacifying pigment in paints, paper coatings, and as a delustering agent for a wide variety of fibers. To enhance or create pigmentary properties which are specially designed for the enduse to which the $TiO_2$ pigment will be put, the pigment is conventionally coated or mixed with other substances.

A highly desirable property, particularly in outdoor applications, for a paint composition to have is durability or resistance to weathering and chalking. To achieve durability in paint compositions, titanium dioxide pigment has been coated with one or more hydrous oxides, particularly silicon dioxide to insure a degree of durability. Other methods of enhancing the light stability of $TiO_2$ pigments utilizing small quantities of multivalent metals incorporated in the crystal lattice of $TiO_2$ have been utilized. One typical method, described in German Pat. No. 2,545,243, involves applying metal ions of a compound from the group Cu, Mn, V, Nb, Ta, Mo, W and Sb to titanium dioxide and heat treating the resulting titanium dioxide at temperatures from 500° to 1000° C. from 0.1 to 10 hours. After heating treatment, cooper, magnesium and/or vanadium ions can also be applied. According to this teaching, utilization of the metals specified decreases the defect electron concentration in the pigment surface upon irradiation with light and, therefore, increases the stability of the resulting pigment to the action of light. It is also taught in this patent that use of lower valent metal ions, such as aluminum or zinc, in the same manner would have exactly the opposite effect by increasing the defect electron concentration and therefore increasing the sensitivity of the pigment to light.

Although the $TiO_2$ pigment treated in accordance with the above-described process may exhibit light stability in paint applications which is superior to untreated $TiO_2$, in applications where the pigment must exhibit light stability in the absence of oxygen, e.g., in paper laminates, these pigments have a strong tendency to turn gray. Furthermore, most of the pigments resulting from the above-described process have color additives and are not desirable in applications requiring white pigment.

This invention provides for a white $TiO_2$ pigment composition which exhibits improved light stability in the presence or absence of oxygen or moisture.

DISCLOSURE OF THE INVENTION

This invention provides for a pigment composition exhibiting the X-ray pattern of rutile consisting essentially of from 92% to 99% by weight of $TiO_2$, from 0.05% to 2% by weight of $Al_2O_3$ and from 0.1% to 6% by weight of antimony oxide, calculated as $Sb_2O_3$, wherein the $Al_2O_3$ and antimony oxide are in solid solution with the $TiO_2$ or antimony oxide is in solid solution with $TiO_2$ or in the form of $AlSbO_4$ or a combination of the above, all weights being based on the weight of the total pigment composition.

By "consisting essentially of" is meant reading on not only the recited ingredients but also upon the recited ingredients plus minor amounts of additional, unspecified substances, the presence of which would not affect the efficacious properties of the ingredients expressly recited. The antimony oxide may be in the form of $Sb_2O_3$, $Sb_2O_4$, $Sb_2O_5$ or mixtures thereof. The pigment composition exhibits improved light stability in, for example, paints, where the presence of oxygen or moisture can cause instability and in, for example, paper laminates and plastics, where graying can occur in the absence of oxygen.

The pigment composition is characterized by exhibiting an X-ray pattern which is predominately rutile with at most only trace amounts of other structures present. Consequently, because the compound $AlSbO_4$ is isostructural with rutile, it is believed that the $Al_2O_3$ and antimony oxide present in the pigment combine to form $AlSbO_4$ at the temperatures utilized to prepare the composition. This is further evidenced by the observation that antimony oxide and $Al_2O_3$ reacted in the absence of $TiO_2$ will form $AlSbO_4$ under the same reaction conditions.

To insure the optimum combination of desirable properties in the pigment composition it is preferred that the weight ratio of antimony oxide, calculated as $Sb_2O_3$, to $Al_2O_3$ be from 0.5:1 to 3:1. Because it is believed that $AlSbO_4$ contributes most significantly to property improvement, lesser amounts of antimony oxide will be insufficient to react with the $Al_2O_3$ present in or on the $TiO_2$ pigment. Larger amounts of antimony oxide will not cause significant improvement in performance properties and may cause yellowing of the pigment composition if used in large excess. Amounts of $Sb_2O_3$ within the range taught by this invention will go into solid solution with the $TiO_2$ or react with alumina and do not detract from the desired whiteness. The most preferred pigment composition consists essentially of 97% by weight of $TiO_2$, 1% by weight of $Al_2O_3$ and 2% by weight of antimony oxide, based on the weight of the pigment composition.

According to the invention there is also provided an improved process for preparing $TiO_2$ pigment composition by contacting the $TiO_2$ pigment with a metal hydroxide or metal oxide and heat treating the resulting pigment at elevated temperatures. The improvements reside in utilizing a $TiO_2$ pigment, of the rutile structure, having from 0.05% to 2% by weight of $Al_2O_3$ incorporated therein or on the surface thereof, applying $Sb(OH)_3$, $SB(OH)_5$, antimony oxychlorides, $Sb_2O_3$ or $Sb_2O_5$ onto the surface of the $TiO_2$ pigment, and heat treating the resulting pigment.

The alumina-containing $TiO_2$ pigment useful in this process can be obtained from a variety of common sources. One method for applying a surface coating of alumina to $TiO_2$ involves forming an aqueous slurry of $TiO_2$, adding a source of alumina such as sodium aluminate to the slurry, and precipitating hydrous alumina onto the surface of the pigment by adjustment of the pH to from 7.2 to 11. The alumina is precipitated in the hydrous form in order to provide a composition which is highly reactive when heated with antimony oxides or precipitated products of antimony chlorides. By highly reactive is meant at least 75% of the antimony combines with the alumina when heated to from 300°–650° C. for one-half hour.

A preferred source of alumina-containing $TiO_2$ comes from the vapor phase process for preparing $TiO_2$, such as described in U.S. Pat. No. 2,559,638, wherein titaniferous ore is first chlorinated at elevated temperatures then subjected to oxidation in the presence of small regulated quantities of aluminum chloride. The maximum amount of aluminum chloride added is about 2% by weight as larger amounts do not combine with the $TiO_2$. Preferably about 1% by weight aluminum chloride is added as this is sufficient to insure that the $TiO_2$ so formed is rutile. The vapor phase process $TiO_2$ is commercially attractive in that it eliminates the cost associated with coating alumina on the pigment. Further benefits are obtained because the alumina is contained within the boundaries of the pigment particle. Thus, when treated with antimony compounds and heated, the resulting $AlSbO_4$ or solid solution $Al_2O_3/TiO_2/Sb_2O_4$ is also contained within the boundary of the pigment particle. As a consequence of this formation, the pigment particles are not adversely affected in durability characteristics by subsequent grinding commonly required for end use operations. In contrast, conventional coatings on $TiO_2$ pigments which improve durability are damaged by grinding. An additional advantage is that the pigment composition is uniform in surface area and porosity, thus providing a consistent product for end use applications and enhancing the gloss in end use.

There are a number of methods which can be utilized to apply the antimony hydroxides or oxides to the $TiO_2$ pigment prior to or during heat treatment. The hydroxides are conveniently applied using a conventional precipitation process. Typically the corresponding antimony compound, i.e., $SbCl_3$ or $SbCl_5$, is dissolved or dispersed in an aqueous slurry of $TiO_2$ pigment after which the pH of the slurry is increased to precipitate the compound as the corresponding hydroxide, or partially neutralized products, i.e., $Sb(OH)_3$, $Sb(OH)_5$, or antimony oxychlorides, onto the pigment surface. Typically, the pH is increased to about 7. It is preferred that the slurry of the alumina-containing $TiO_2$ pigment contain from 10% to 70% by weight of pigment to insure that the alumina-containing $TiO_2$ pigment can be completely contacted by the antimony compound. The amount of antimony compound should desirably be from 0.1% by weight to 6% by weight, based on the weight of the $TiO_2$ and calculated as antimony oxide. The temperature of the hydrolysis reaction is not particularly critical and can range from ambient to 100° C. However, to form the antimony hydroxide in the most efficient manner it is preferred that the temperature of the hydrolysis range from 70° to 90° C.

After contact of the antimony hydroxide with the $TiO_2$ pigment particles, the so-treated solid can be isolated from the aqueous reaction medium in any convenient manner, such as filtration. The treated pigment is then heated for a period from one minute to several hours, preferably from 10 to 60 minutes, at a temperature from 300° to 650° C. to insure the formation of $AlSbO_4$ and/or solid solution with $TiO_2$. It has been found in accordance with the teachings of this invention that a temperature of at least 300° C. is necessary to form a final pigment composition having the desired durability, as measured by acid solubility of the pigment composition. The time period during which the hydroxide-coated alumina-containing $TiO_2$, pigment is heated can vary over a wide range and, of course, at the lower temperature limit more time is recommended than at the upper temperature limit. One-half hour is recommended over the 300°–650° C. temperature range, but as little as one minute can be utilized successfully at temperatures as high as 650° C. At temperatures from 650°–1500° C. only 5–200 seconds of heat treatment are required. Longer treatment at these temperatures are not recommended as the pigment may sinter.

The pigment compositions of the invention can also be prepared by simultaneously applying the antimony hydroxide or oxide to the $TiO_2$ and heating. One method involves intimately mixing alumina-containing $TiO_2$ pigment with an inorganic antimony compound, such as $SbCl_3$ or $SbCl_5$ in the presence of steam at a temperature from 300° to 650° C. This operation can conveniently be accomplished in a rotary calciner. In the case where the pigment itself may be partially wet, there is no need to add additional steam. In this way the corresponding antimony hydroxide rapidly forms by reaction of the antimony compound with the steam and the resulting hydroxide reacts with the alumina present in the pigment at the elevated temperatures.

In a variation of the above method, alumina-containing $TiO_2$ pigment can be dry mixed and heat treated with antimony oxide at temperatures from 300° to 650° C. to form the pigment composition of the invention. The rotary calciner can conveniently be used.

An alternate method which minimizes dusting is to combine the pigment and antimony oxide in slurry form. Thus, an alumina-containing $TiO_2$ pigment in the form of a 50–70 weight % aqueous $TiO_2$ slurry may be mixed with a 20–50 weight % aqueous antimony oxide slurry to achieve a mixed particulate of desired composition that can be filtered and heat treated to form a durable pigment.

The pigment composition of the invention can also be produced on a large scale continuous basis in conjunction with the vapor phase oxidation process to form $TiO_2$. In this process alumina-containing $TiO_2$ pigment is formed in a reactor at temperatures of about 1500° C. The $TiO_2$ exits the reactor to a flue leg where it is cooled. To form the composition of the invention, a 20–50 weight % aqueous antimony oxide slurry is introduced into the flue leg at a point where the temperature of the pigment is above 650° C., most commonly about 1100°–1300° C. The pigment and antimony oxide proceed through the flue leg and are thereby subjected to temperatures in excess of 650° C. for 5–200 seconds, preferably 5–30 seconds, resulting in the composition of the invention.

Although this invention is not bound by any particular theory or explanation, it is believed that the antimony hydroxide or oxide reacts with the alumina present in the $TiO_2$ pigment from the surface to the core and in most cases reacts with about 50% of the alumina present to form $AlSbO_4$, the remainder going into solid solution with $TiO_2$. If more antimony oxide is present than can be reacted with the alumina and enter into solid solution with the $TiO_2$, the excess antimony oxide, thought to be in the form of $Sb_2O_4$, can cause yellowing of the pigment composition. The $AlSbO_4$ is believed to be particularly effective because it is isostructural with rutile $TiO_2$ and is a very stable compound with respect to light, acid and base.

The pigment composition of the invention can be processed and used in the same manner as conventional pigment. It is a common practice in finishing pigment to treat the pigment with hydrous alumina to enhance dispersibility aand micronize the treated pigment to obtain desired deaggregation. These treatments are also preferred for the pigment compositions of the invention for the same reasons. However, these treatments are not critical to the practice of the invention and do not significantly influence the light stability of the pigment compositions.

BEST MODE

In the examples which follow the pigments prepared were tested in a conventionally accepted manner for a variety of properties exactly as described below.

Acid solubility, a conventional technique used to predict pigment durability, of the $TiO_2$ pigment compositions prepared in the examples below was measured by digesting a predetermined quantity of the pigment to be tested in sulfuric acid and spectrophotometrically comparing it to a standard $TiO_2$ sample similarly treated. The standard spectrophotometric curve was prepared as follows: A standard solution was prepared by dissolving 15 g of ammonium sulfate and 1.0118 g of $TiO_2$, containing 98.83% by weight $TiO_2$, in 20 ml of 66° Be. sulfuric acid and diluting to 800 ml with water. Eighty milliliters of the 66° Be. sulfuric acid solution was then added to this solution. After allowing the resulting solution to cool to room temperature, it was diluted to 1 liter with water. The solution contained 0.001 g of $TiO_2$ per ml and was allowed to stand for one week before using.

Samples of 2, 4, 6 and 8 ml of the above-prepared standard solution were each mixed with 10 ml of 30% hydrogen peroxide and diluted to 100 ml with 10% sulfuric acid. After standing for one hour the absorbences of these solutions were read using a Beckman Model DK, DU or B spectrophotometer against a reference solution, prepared by diluting 10 ml of 30% hydrogen peroxide to 100 ml with 10% sulfuric acid at 400 nm using 10 mm cells. A plot of titanium peroxide concentration in mg/l versus optical density was made for these samples.

To determine the acid solubility of the pigments to be tested, 0.2000 g of the pigment was added with stirring to 10 ml 60° Be. sulfuric acid at 175° C. The pigment was digested at 175° C. for one hour. After digestion the sample was quenched by pouring into crushed ice, made from distilled water. The sample was diluted to 100 ml with water and filtered. Ten milliliters of the filtrate was mixed with 2 ml of 30% hydrogen peroxide and diluted to 25 ml with 10% sulfuric acid. After one hour the absorbence of the sample was read against a reference, prepared by diluting 2 ml of 30% hydrogen peroxide to 25 ml with 10% sulfuric acid.

The concentration of soluble $TiO_2$ was determined by the above-prepared standard spectrophotometric curve from the measured optical density and the percent soluble $TiO_2$.

Gloss was determined in the following manner. A starting composition or mill base was prepared by manually mixing 387.0 g of the $TiO_2$ pigment to be tested with 149.6 g of an alkyd resin (a commercial resin sold by Celanese Coatings Co. under the name "Syntex" 3145, 60% N.V.), 9.4 g of butanol, and 79.0 g of a commercially available aromatic solvent (sold by Esso Standard Oil under the name "Xylol"). The mixture was then placed in a container, inserted in a machine equipped with a sand grinding disc and 700 g of sand was added at a rotation speed of 500 rpm. After adding all the sand, grinding was continued for five minutes at 2750 rpm. The mill base was isolated from the sand by filtration through coarse and fine strainers.

The mill base was reduced by mixing 100 g of the mill base with 1.4 g of a commercially available aromatic solvent ("Xylol"), 71.8 g of alkyd resin ("Syntex"3145), 38.5 g of a 55% solids cross-linking melamine resin (a commercial resin sold by American Cyanamid under the name "Cymel" 248-8), 12.0 g of naphtha and 1.0 g of butanol. The resultant mixture constituted the finished paint formulation. In order to prepare the paint for spraying, additional "Xylol" was added to a given weight of the paint so that 50 ml flowed through a 10 F viscosity cup in 16 seconds.

The reduced paint was sprayed onto an aluminum panel to visual hiding, i.e. a film thickness of about 1.2 mils. The panel was flashed or allowed to stand for 10 minutes at room temperature to allow the volatile components to evaporate and was then baked for 45 minutes at 149° C.

The panels were allowed to cool, then placed on a gloss meter set at an angle of 20° and the gloss was read directly from the gloss meter.

Sensitivity of the pigment to light, i.e., as measured by the amount of graying, was determined by exposing the pigment to intense UV radiation for a given time, then visually observing the degree to which the pigment grayed relative to a standard. To prepare the pigment to be tested for exposure, 0.5 g of the pigment was mixed with 2.5 g of basic carbonate of white lead and transferred to a clean color plate. To the mixture on the plate 0.75 ml of glycerine was added and rubbed in with a glass muller. The mixture was then placed between two glass slides and exposed through the glass to a sunlamp (super pressure unfiltered mercury source) at a distance of 14 inches (35.6 cm) for five minutes. The tested pigment was visually compared with a standard pigment tested the same way to determine the relative amount of graying. The tested pigments are graded from 10 (dark) to 0 (light, no color change), the degree of darkening indicates the amount of graying.

The determination of chalk/fade was in accordance with the procedure described by W. H. Daiger and W. H. Madson in Vol. 39, July 1967, of the Journal of Paint Technology, pages 399-410. Specifically, the tests used for obtaining data in this application were made on paints of the following formulation:

|  | Grams |
|---|---|
| $TiO_2$ pigment | 48.0 |
| Blue copper phthalocyanine pigment (a commercial organic pigment sold by the Du Pont Company under the name "Ramapo" Blue BP-366-D) | 6.0 |
| Alkyd resin (a commercial resin sold by Celanese Coatings Company under the name "Syntex" 3833 50% N.V.) | 120.0 |
| Organic solvent, boiling range 160° C.-193° C. (commercial solvent sold by Humble Oil and Refining Company under the name "Varsol" #1) | 36.0 |
| "Xylol" | 36.0 |
| 24% Pb naphthenate drier | 0.75 |
| 6% Co naphthenate drier | 0.40 |
| 6% Mn naphthenate drier | 0.20 |

These ingredients were ground in a rotating glass jar containing 400 g of 0.5 inch (12.7 cm) glass balls for about 42 hours and the resulting paint sprayed, without reduction, onto aluminum panels for exposure tests.

On exposure, the blue paint film degrades and a white film forms on the surface. This is designated as "chalking". The degree of chalking was measured by recording the red reflectance of the panel at various intervals. Red reflectance increases as the chalking progresses. To determine the numbers reported, the panels were exposed in an accelerated weather machine until the instrument gave a fixed reading, arbitrarily set to indicate a welldefined degree of chalking. The red reflectance was measured every 100 hours and recorded. A low value of Δ red reflectance is desirable. The instrument used to obtain red reflectance is a reflectomer adapted to read light intensity reflected from the panel surface through a red filter.

EXAMPLE 1

Twenty-four pounds (11 kg) of a commercially available rutile $TiO_2$ pigment, containing 98.9% by weight of $TiO_2$ and 1.1% by weight of $Al_2O_3$, prepared by the vapor phase cooxidation of $TiCl_4$ and $AlCl_3$ was blended and calcined at 650° for one hour with 1.02 kg of $SbCl_5$, or 4.3% by weight, calculated as $Sb_2O_3$.

Eight pounds (3.63 kg) of the above-prepared pigment composition was slurried in 9.08 liters of water at 60° C. using a steam coil and with continued stirring. To precipitate 3% by weight of hydrous alumina onto the pigment composition, 273.6 ml of a 333 g/l solution of $NaAlO_2$ was diluted with 273.6 ml of a of water and added to the slurry with stirring. The pH of the slurry was maintained at 8.5 using 1:1 $HCl/H_2O$ solution (35–38% HCl) during the addition of $NaAlO_2$. The slurry was cured at 60° C. for 30 minutes, filtered and the filter cake dried for 12 hours at 120° C.

To insure a deaggregated pigment composition, the dried filter cake was blended with 0.3% by weight of triethanol amine, a common micronizing aid, and passed through a fluid energy mill with steam at 500° F. (260° C.) at a steam/pigment ratio of 3:1.

The pigment composition prepared above was tested for gloss, graying and durability via the chalk/fade index relative to two commercially available standards. The first standard, S-1, is a $TiO_2$ pigment prepared by the vapor phase oxidation of $TiCl_4$ in the presence of 1.1% of $AlCl_3$ and containing a coating of 6% by weight of dense amorphous silica and 2% by weight of hydrous alumina. The first standard, S-1, is considered in the industry to be a highly durable pigment. The second standard, S-2, is a $TiO_2$ pigment prepared by the vapor phase cooxidation of $TiCl_4$ in the presence of 1.1% of alumina and containing a coating of 3% by weight of hydrous alumina. The second standard, S-2, is known in the industry for high gloss, but exhibits durability and light stability which is too low for many applications wherein durability to chalk fade is required.

The data for these pigments is shown in Table I.

TABLE I

| Pigment Tested | Gloss | Amount of Graying | Initial Red Reflectance | Chalk/Fade Δ Red Reflectance (1305 hrs. Exposure) | % Acid Solubility |
|---|---|---|---|---|---|
| Ex. 1 | 70 | 1 | 7.2 | 12.1 | 2.3 |
| S-1 | 52 | 2 | 7.1 | 12.0 | 2.8 |

TABLE I-continued

| Pigment Tested | Gloss | Amount of Graying | Initial Red Reflectance | Chalk/Fade Δ Red Reflectance (1305 hrs. Exposure) | % Acid Solubility |
|---|---|---|---|---|---|
| S-2 | 75 | 8 | 7.4 | 18.1 | 30 |

EXAMPLES 2–6

The $TiO_2$ pigment was prepared as described in Example 1 except that portions of resulting pigment were calcined for one hour at temperatures from 125° to 650° C. The acid solubility of the resulting pigments were measured to determine the effect of calcination temperature on this property. The results are shown in Table II.

TABLE II

| Example | Calcination Temp., °C. | Acid Solubility |
|---|---|---|
| 2 | 125 | 30 |
| 3 | 250 | 23.5 |
| 4 | 400 | 1.5 |
| 5 | 500 | 0.7 |
| 6 | 650 | 0.4 |

EXAMPLES 7–12

The $TiO_2$ pigment was prepared as described in Example 1 except that the amount of $SbCl_5$ was varied to provide a series of pigments having in theory from 0.16% by weight of $AlSbO_4$ to 3.75% by weight of $AlSbO_4$. The acid solubility of each of these pigments was measured to determine the effect of the percent of $AlSbO_4$ on this property of the pigments. The amounts of $SbCl_5$ and $TiO_2$ pigment utilized in each case, the amount of $AlSbO_4$ that could theoretically be formed, and the acid solubility are shown in Table III.

TABLE III

| Ex. | $TiO_2$ Pigment (1.1% $Al_2O_3$),g | $SbCl_5$ g | $AlSbO_4$* g | $AlSbO_4$ % By[4] Weight | Acid Solubility |
|---|---|---|---|---|---|
| 7 | 53 | 3 | 2.04 | 3.75 | 0.4 |
| 8 | 53 | 2 | 1.36 | 2.50 | 2.6 |
| 9 | 53 | 1 | 0.68 | 1.25 | 11.1 |
| 10 | 106 | 1 | 0.68 | 0.63 | 15.5 |
| 11 | 212 | 1 | 0.68 | 0.32 | 20.9 |
| 12 | 212 | 0.5 | 0.34 | 0.16 | 30.2 |

*Calculated value assuming complete reaction of $Al_2O_3$ with antimony oxide.

EXAMPLES 13, 14 and Controls

A pigment composition of the invention was prepared by dry mixing 96.5 g of 1.1% alumina-containing $TiO_2$ pigment described in Example 1 with 3.5 g of particulate $Sb_2O_3$. The mixture was placed in a rotary calciner for one hour at 400° and 650° C. The acid solubility and X-ray structure for the pigment composition prior to calcination and at each calcination temperature are shown in Table IV. The acid solubility of the alumina-containing $TiO_2$ pigment per se is 32 and the X-ray is rutile.

TABLE IV

| Example | Calcination Temperature, °C. | Acid Solubility | X-ray |
|---|---|---|---|
| dry mix | ambient | | $Sb_2O_3$/ |

TABLE IV-continued

| Example | Calcination Temperature, °C. | Acid Solubility | X-ray |
|---|---|---|---|
| 13 | 400 | 3.1 | rutile |
| 14 | 650 | 0.65 | rutile |

Control pigment compositions, C-13 and C-14, were prepared and calcined exactly as described above except that the starting $TiO_2$ pigment contained no alumina. Data for the control compositions are shown in Table V. The acid solubility of the starting $TiO_2$ pigment containing no alumina is 49 and the structure is rutile.

TABLE V

| Control | Calcination Temperature, °C. | Acid Solubility | X-ray |
|---|---|---|---|
| dry mix | ambient | — | $Sb_2O_3$/rutile |
| C-13 | 400 | 9.0 | $Sb_2O_4$/rutile |
| C-14 | 650 | 8.0 | $Sb_2O_4$/rutile |

INDUSTRIAL APPLICABILITY

The pigment compositions of the invention provides a highly durable lightfast $TiO_2$ pigment which can be utilized in a wider variety of end-use applications than conventional titanium dioxide pigment. Conventional equipment can be utilized to prepare the pigment without the need for expenditure on new equipment.

I claim:

1. A pigment composition having the X-ray pattern only of rutile, said composition consisting essentially of from 92% to 99% by weight of $TiO_2$, from 0.05% to 2% by weight of $Al_2O_3$ and from 0.1% to 6% by weight of antimony oxide, calculated as $Sb_2O_3$.

2. The pigment composition according to claim 1 wherein the weight ratio of antimony oxide to $Al_2O_3$ is from 0.5:1 to 3:1.

3. The pigment composition according to claim 1 wherein the pigment composition consists essentially of 97% by weigh of $TiO_2$, 1% by weight of $Al_2O_3$ and 2% by weight of antimony oxide.

4. A process comprising contacting a rutile $TiO_2$ pigment having from 0.05% to 2% by weight of $Al_2O_3$ incorporated therein, but which has a structure that is complete rutile, with $Sb_2O_5$, $Sb(OH)_3$, $Sb(OH)_5$, $Sb_2O_3$, or partially neutralized products from $SbCl_3$ and $SbCl_5$, and heat treating the resulting composition at a temperature from 300° to 1500° C. to form a $TiO_2$ pigment composition having only a rutile structure.

5. Process according to claim 4 wherein $Sb(OH)_3$ or partially neutralized $SbCl_3$ is contacted with the $TiO_2$ pigment by forming an aqueous slurry of $SbCl_3$ and $TiO_2$ pigment and increasing the pH of the slurry to precipitate the $Sb(OH)_3$ or partially neutralized products on the surface of $TiO_2$ pigment.

6. Process according to claim 4 wherein $Sb(OH)_5$ or partially neutralized $SbCl_5$ is contacted with the $TiO_2$ pigment by forming an aqueous slurry of $SbCl_5$ and $TiO_2$ pigment and increasing the pH of the slurry to precipitate the $Sb(OH)_5$ or partially neutralized products on the surface of $TiO_2$ pigment.

7. Process according to claim 4 wherein the $TiO_2$ pigment composition is prepared by intimately mixing $TiO_2$ pigment with particulate $Sb_2O_3$ and heating at a temperature from 300° to 650° C.

8. Process according to claim 4 wherein the $TiO_2$ pigment composition is prepared by intimately mixing $TiO_2$ pigment and at least one of $SbCl_3$ and $SbCl_5$ in the presence of moisture and at a temperature from 300° to 650° C.

9. Process according to claim 4 wherein the $TiO_2$ pigment containing $Al_2O_3$ is in the form of a 50-70 weight percent aqueous pigment slurry and the $Sb_2O_3$ is in the form of a 20-50 weight percent aqueous antimony oxide slurry.

10. Product obtained according to the process of claim 9.

11. Process according to claim 4 wherein the $TiO_2$ pigment and $Sb_2O_3$ are contacted and simultaneously heat treated at a temperature of from 650°-1500° C. for a period of from 5-30 seconds.

12. Product obtained according to the process of claim 11.